Figure 1:
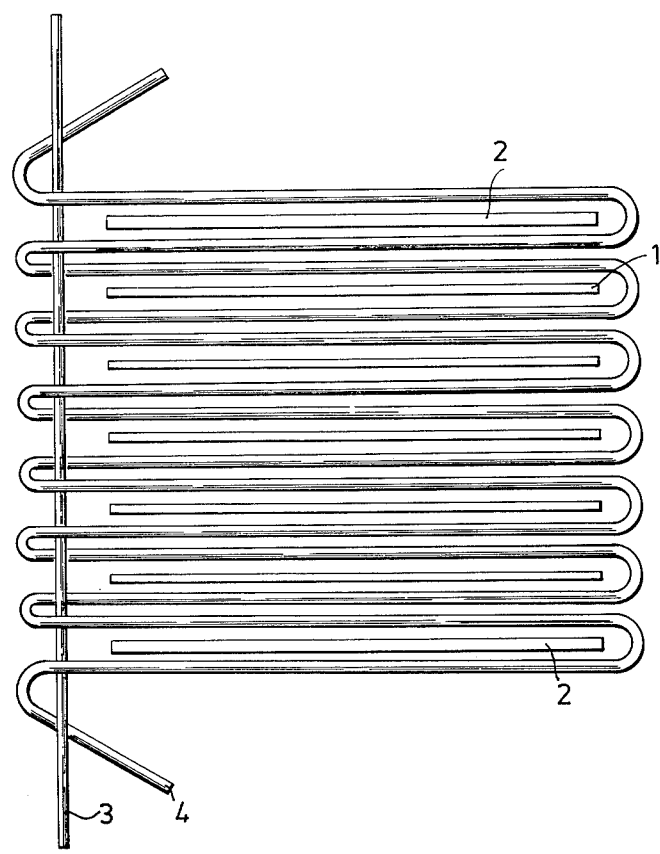

United States Patent [19]

Andersson et al.

[11] 4,257,330

[45] Mar. 24, 1981

[54] PROPELLING CHARGE FOR A RECOILLESS WEAPON OR A ROCKET AND A METHOD TO PRODUCE THE CHARGE

[75] Inventors: Gösta A. Andersson; Karl-Einar Lantz; Rune V. Åkhagen, all of Eskilstuna, Sweden

[73] Assignee: Forenade Fabriksverken, Eskilstuna, Sweden

[21] Appl. No.: 3,930

[22] Filed: Jan. 16, 1979

[30] Foreign Application Priority Data

Jan. 18, 1978 [SE] Sweden .............................. 7800568

[51] Int. Cl.³ ............................................... F42B 1/00
[52] U.S. Cl. ............................. 102/100; 102/38 RA; 102/38 RL; 102/99
[58] Field of Search .................. 102/99, 100, 38 RL, 102/38 RA, 40

[56] References Cited

U.S. PATENT DOCUMENTS

| | | | |
|---|---|---|---|
| 2,514,412 | 7/1950 | Owens | 102/100 |
| 3,734,024 | 5/1973 | Andersson | 102/100 |
| 3,898,934 | 8/1975 | Mercier | 102/100 |
| 3,961,581 | 6/1976 | Larue | 102/99 |

FOREIGN PATENT DOCUMENTS

| | | | |
|---|---|---|---|
| 437228 | 12/1911 | France | 102/100 |
| 340768 | 10/1971 | Sweden | 102/100 |
| 5927 | of 1915 | United Kingdom | 102/100 |

*Primary Examiner*—Donald P. Walsh
*Attorney, Agent, or Firm*—Fleit & Jacobson

[57] ABSTRACT

This invention relates to a propelling charge comprising several rectangular powder strips for a recoilless weapon or a rocket and a method to produce the charge. The strips are piled on each other and joined with one or more threads at one side of the pile and the pile is bent to a tubular shape, at which the edges of the strips that are joined to each other generate the inner side of the tube.

An even ignition and combustion of the powder is achieved with the suggested powder strip arrangement.

23 Claims, 3 Drawing Figures

PROPELLING CHARGE FOR A RECOILLESS WEAPON OR A ROCKET AND A METHOD TO PRODUCE THE CHARGE

This invention relates to a propelling charge comprising several rectangular powder strips for a recoilless weapon or a rocket and a method to produce the charge.

Powder strips are at present used in powder charges for recoilless weapons and in an usual design they are placed in a space (the charge case) which they are allowed to fill at random and disorderly. In these cases the best thing is to apply the discharge effect from a short side of the space for the charge in order to avoid the large surfaces of the strips being put in a crosswise position to the ignition gas. Under these conditions the way of the ignition gas through the package of strips will equal the length of the strips.

The intensity, i.e. the velocity and the temperature of the ignition gas are in this case apparently higher in the part of the propelling charge that is close to the ignition than in the opposite one, i.e. there is a relatively uneven ignition and total inflamming of the propelling powder.

One of the greatest problems and also one of the most difficult to solve by such a powder arrangement is that propelling powder is ejected through the nozzle. Ejection of totally or partially burnt powder elements amounting to about 10–20% of the total amount of powder are usual. These ejections of powder contribute largely to the speed differences of the weapon.

Another reason for the speed differences of the weapon is the uneven inflamming of the combustible surfaces of the propelling powder.

In attempts to overcome among other things the indicated disadvantages it has been suggested that the strips shall be joined e.g. cast together at their outer edges and placed at the mantle wall of the space for the charge, so that the edges of the strips are directed towards the centre of the space.

In this position the powder will to the lowest extent be exposed to high gas velocities. With a central ignition in the shape of a tube in the centre of the space for the charge the powder will not be effected by the ignition gases until they have been spread whereby the ignition is acting against a greater part of the propelling powder than if it had been located in a direct connection to the ignition charge. Further the powder strips are not displaced towards the nozzle under the influence of the ignition gas, they are pressed against the outer wall of the space for the charge.

One disadvantage of having the outer edges of the strips embedded in e.g. plastic is that these edges continue to burn after the end of the actual combustion, so that flames of fire and smoke may disclose the position of the weapon also after a shot.

This invention relates to an improved propelling charge for recoilless weapons and rockets, which exposes the propelling powder to a maximum extent to ignition from an igniting device located axially and centrally in the space for the charge. Thus improved ignition and combustion characteristics are achieved, which counteract ejection of powder and speed differences. This invention does also comprise a method to produce such a propelling charge.

The advantageous qualities are achieved by designing the invention as stated in the following claims.

Figure 2:
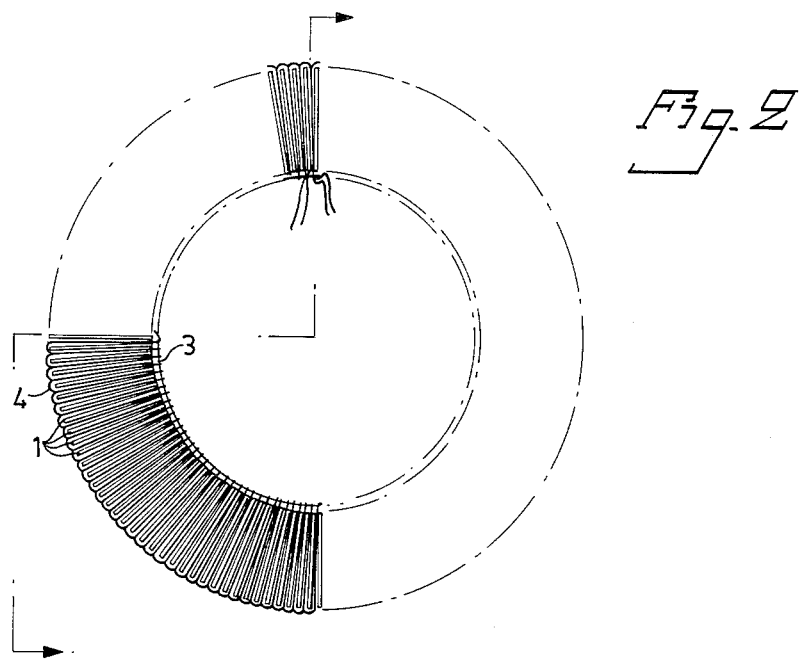
Figure 3:
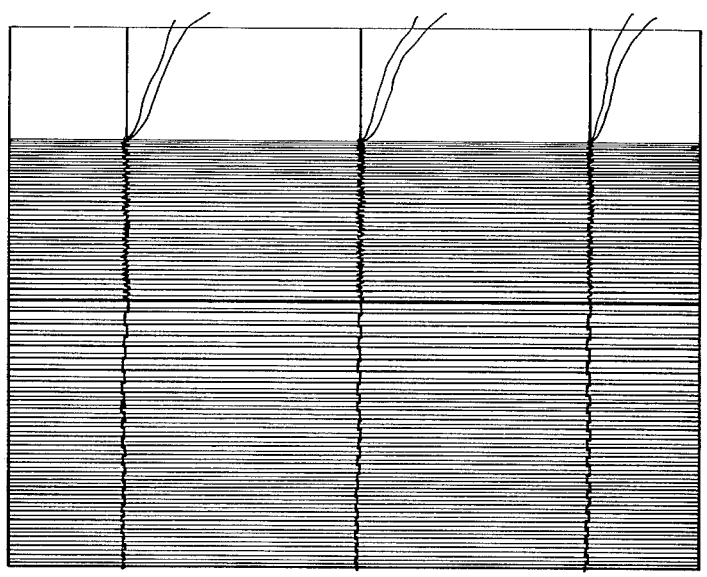

In the following one embodiment of the invention will be described with reference to the accompanying drawing where FIG. 1 shows a shortened pile of joined powder strips, FIG. 2 shows in a diminished scale a pile according to FIG. 1 bent into a tubular shape and FIG. 3 shows the tubular propelling charge of FIG. 2 partially in section seen from sideways.

A propelling charge according to the invention comprises several rectangular powder strips 1, that are piled on each other while they are joined with one or more threads 3 and 4 at one side of the pile, after which the pile is bent to a tubular shape so that the edges of the strips 1, that are joined to each other generate the inner side of the tube.

Further according to a suitable design the propelling charge will keep its tubular shape by the fact that the ends of the threads of both ends of the pile are joined.

A preferred method to fix the brittle strips 1 with the joining threads 3 and 4 so that the strips will not break is to tie the thread or the threads round the strips 1. Hereby the threads 3 and 4 will also, by being drawn in this case between each pair of strips, act as a spacer, that by a selection of thread diameter will give the wanted distance between the strips 1 and thereby the propelling charge a predetermined density.

To give the propelling charge a certain rigidity but also to guarantee a good spacing between the strips 1 they will be joined at more than one place, preferably 2–4 places, along one of their sides. In FIG. 3 a propelling charge is shown with three joints.

By using two threads 3 and 4 at each joint it is possible to draw the threads so that after the joining of the strips 1 it is possible to stretch one of these before joining the ends of the threads at the ends of the charge without breaking the brittle strips 1. If two threads are used it is also possible to carry out the method with a simple and reliable machine.

The thread that is used is suitably hard and inelastic so that its cross section is on the whole undeformed at the sharp bends to which it is subjected. If the cross section of the thread is deformed it is difficult to estimate the distance between the strips 1. An example of a thread that has been successfully used is the Swedish military trip thread m/50 having a diameter of 0.4 mm.

To facilitate the bending of the pile to a tubular shape a stronger strip 2, preferably of cardboard, can be fixed to each end of the pile in the same way as the powder strips. Otherwise the outer strips will easily break.

A preferred method to produce the propelling charge, which have most of the advantages that has been described above and furthermore owing to the compression of the pile and the stretching of one of the threads 3, called the tying thread, will give a well controlled diameter to the charge, comprises the steps piling the strips 1 while a tying thread at each joint is drawn chiefly perpendicular to the strips 1 at one of their edges and for each tying thread 3 a running thread 4 is drawn, on the whole perpendicular both to the tying thread 3 and the edges of the strips 1, that are lying at the tying thread, along a first surface of each strip, round the edge that is directed from the tying thread, along a second surface of each strip, round the tying thread 3 and after that back along the second surface chiefly parallelly to its previous direction, after which next strip 1 is piled on the previous strip, at which the running thread 4 will run along the first surface of the second strip, after which the method is repeated until a pile with a predetermined number of strips has been formed, whereupon the pile is compressed to a predetermined height and the tying thread 3 is stretched with a predetermined force and is tied to the running thread 4 in each end of the pile, after which the pile is bent to a tubular shape and the ends of the threads in both of its ends are tied together.

As an example of the size of the strips of which propelling charges has been made can be mentioned strips having a length of 130 mm, a width of 17 mm and a thickness of 0.35 mm.

We claim:

1. A propelling charge comprising several rectangular powder strips for a recoilless weapon or a rocket, wherein the strips are piled on each other and joined with at least one joining thread at one side of the pile, and wherein the pile is bent into a tubular shape in such a manner that the edges of the strips, which are joined to each other, form an inner side of the tube.

2. A propelling charge as recited in claim 1, wherein the pile is kept in a tubular shape by virtue of the fact that the ends of the threads of both ends of the pile are joined.

3. A propelling charge as recited in any one of claims 1 or 2, wherein the at least one joining thread is tied round each strip.

4. A propelling charge as recited in any one of claims 1 or 2, wherein the strips are joined at more than one place along one of their sides.

5. A propelling charge as recited in any one of claims 1 or 2, wherein the joining is carried out with two threads at each joint.

6. A propelling charge as recited in any one of claims 1 or 2, wherein the thread diameter is chosen in such a way that the charge will get a predetermined density.

7. A propelling charge as recited in any one of claims 1 or 2, wherein the thread that is used is hard and inelastic so that its cross section is, on the whole, undeformed at the sharp bends to which it is subjected.

8. A propelling charge as recited in any one of claims 1 or 2, wherein a stronger strip, preferably of cardboard, is fixed to each end of the pile in the same way as the powder strips.

9. A method for producing a propelling charge comprising several rectangular powder strips for a recoilless weapon or a rocket comprising the steps of piling the strips on each other and joining them with at least one thread at one side of the pile, and bending the pile into a tubular shape so that the edges of the strips that are joined to each other generate an inner side of the tube.

10. A method as recited in claim 9, wherein the pile is kept in a tubular shape by joining the ends of the threads of both ends of the pile.

11. A method as recited in any one of claims 9 or 10, wherein the at least one joining thread is tied round each strip.

12. A method as recited in any one of claims 9 or 10, wherein the strips are joined at more than one place along one of their sides.

13. A method as recited in any one of claims 9 or 10, wherein the joining is carried out with two threads at each joint.

14. A method as recited in any one of claims 9 or 10, wherein the thread diameter is chosen in such a way that the charge will get a predetermined density.

15. A method as recited in any one of claims 9 or 10, wherein a hard and inelastic thread is chosen so that its cross section is, on the whole, undeformed at the sharp bends to which it is subjected.

16. A method as recited in any one of claims 9 or 10, wherein a stronger strip, preferably of cardboard, is fixed to each end of the pile in the same way as the powder strips.

17. A method as recited in any one of claims 9 or 10, wherein, during the piling, at each joint, a tying thread is drawn perpendicular to the strips at one of their edges and, for each tying thread, a running thread is drawn, on the whole, perpendicular both to the tying thread and the edges of the strips that are lying at the tying thread, along a first surface of each strip, round the edge that is directed from the tying thread, along a second surface of each strip, round the tying thread and, after that, back along the second surface chiefly parallel to its previous direction, after which the next strip is piled on the previous strip, at which the running thread will run along the first surface of the second strip, after which the method is repeated until a pile with a predetermined number of strips has been formed, whereupon the pile is compressed to a predetermined height and the tying thread is stretched with a predetermined force and is tied to the running thread in each end of the pile, after which the pile is bent to a tubular shape and the ends of the threads in both of its ends are tied together.

18. A propelling charge as recited in claim 3, wherein the strips are joined at more than one place along one of their sides.

19. A propelling charge as recited in claim 3, wherein the strips are joined at a number of places, said number of places being one of 2, 3 or 4.

20. A propelling charge as recited in any one of claims 1 or 2, wherein the strips are joined at a number of places, said number of places being one of 2, 3 or 4.

21. A method as recited in claim 11, wherein the strips are joined at more than one place along one of their sides.

22. A method as recited in claim 11, wherein the strips are joined at a number of places, said number of places being one of 2, 3 or 4.

23. A method as recited in any one of claims 9 or 10, wherein the strips are joined at a number of places, said number of places being one of 2, 3 or 4.

* * * * *